(12) United States Patent
Krishnan

(10) Patent No.: US 7,079,546 B2
(45) Date of Patent: *Jul. 18, 2006

(54) ADAPTIVE BANDWIDTH THROTTLING FOR NETWORK SERVICES

(75) Inventor: Murali R. Krishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,057

(22) Filed: Jun. 15, 2005

(65) Prior Publication Data

US 2005/0243862 A1 Nov. 3, 2005

Related U.S. Application Data

(63) Continuation of application No. 09/802,309, filed on Mar. 7, 2001, which is a continuation of application No. 08/919,633, filed on Aug. 28, 1997, now Pat. No. 6,222,856, which is a continuation-in-part of application No. 08/674,684, filed on Jul. 2, 1996, now Pat. No. 5,799,002.

(51) Int. Cl.
H04L 12/28 (2006.01)

(52) U.S. Cl. ...................................... 370/412; 370/468

(58) Field of Classification Search ............... 370/465, 370/466, 467, 468, 230, 231, 232, 234, 235, 370/229
See application file for complete search history.

(56) References Cited

U.S. PATENT DOCUMENTS

| 4,769,811 | A | | 9/1988 | Eckberg, Jr. et al. | |
|---|---|---|---|---|---|
| 4,914,650 | A | | 4/1990 | Sriram | |
| 5,231,631 | A | * | 7/1993 | Buhrke et al. | 370/230 |
| 5,280,470 | A | | 1/1994 | Buhrke et al. | |
| 5,313,454 | A | | 5/1994 | Bustini et al. | |
| 5,315,586 | A | | 5/1994 | Charvillat | |
| 5,359,320 | A | * | 10/1994 | Jaffe et al. | 370/448 |
| 5,381,413 | A | | 1/1995 | Tobagi et al. | |
| 5,418,782 | A | | 5/1995 | Wasilewski | |
| 5,432,737 | A | | 7/1995 | Yoneda | |
| 5,432,787 | A | | 7/1995 | Chethik | |
| 5,455,826 | A | * | 10/1995 | Ozveren et al. | 370/232 |
| 5,477,542 | A | | 12/1995 | Takahara et al. | |
| 5,600,798 | A | | 2/1997 | Cherukuri et al. | |
| 5,633,861 | A | * | 5/1997 | Hanson et al. | 370/232 |
| 5,701,465 | A | | 12/1997 | Baugher et al. | |
| 5,715,237 | A | | 2/1998 | Akiyoshi | |
| 5,748,900 | A | | 5/1998 | Scott et al. | |
| 5,778,222 | A | | 7/1998 | Herrick et al. | |
| 5,799,002 | A | * | 8/1998 | Krishnan | 370/234 |

(Continued)

Primary Examiner—Hassan Kizou
Assistant Examiner—Ricarcdo Pizarro
(74) Attorney, Agent, or Firm—Lee & Hayes, PLLC

(57) ABSTRACT

The adaptive bandwidth throttling system implements a graceful diminution of services to the clients by delaying a first class of services provided by a network server in response to the effective bandwidth utilized by this network server exceeding a first threshold. If the demand for the bandwidth by this network server exceeds a second threshold, the bandwidth throttling system escalates the throttling response and blocks the first class of services from execution and can also concurrently delay execution of a second class of services. The implementation of the throttling process can be varied, to include additional levels of response or finer gradations of the response, to include subsets of a class of services. In addition, the threshold levels of bandwidth used to trigger the throttling response can be selected as desired by the system administrator.

13 Claims, 13 Drawing Sheets

U.S. PATENT DOCUMENTS

| | | | |
|---|---|---|---|
| 5,812,525 A * | 9/1998 | Teraslinna | 370/229 |
| 6,006,264 A * | 12/1999 | Colby et al. | 709/226 |
| 6,097,722 A * | 8/2000 | Graham et al. | 370/395.21 |
| 6,212,200 B1 | 4/2001 | Iizuka et al. | |
| 6,343,085 B1 | 1/2002 | Krishnan et al. | |
| 6,405,253 B1 | 6/2002 | Schutte et al. | |
| 6,473,793 B1 * | 10/2002 | Dillon et al. | 709/223 |
| 6,799,276 B1 | 9/2004 | Belissent | |

* cited by examiner

ADAPTIVE BANDWIDTH THROTTLING FOR NETWORK SERVICES

RELATED APPLICATIONS

This is a continuation of U.S. patent application Ser. No. 09/802,309, filed Mar. 7, 2001, which is hereby incorporated by reference herein, and which is a continuation of U.S. patent application Ser. No. 08/919,633, filed Aug. 28, 1997, now U.S. Pat. No. 6,222,856, which is a continuation-in-part of U.S. patent application Ser. No. 08/674,684, filed Jul. 2, 1996, now U.S. Pat. No. 5,799,002.

TECHNICAL FIELD

This invention relates to network servers resident on a host computer system and, in particular, to a bandwidth management system which throttles the demands by client processes executing on remote computer systems for network transmission bandwidth.

BACKGROUND

A computer network system has one or more host network servers connected to serve data to one or more client computers over a network. FIG. 1 shows a simple computer network system 20 with a single host network server 22 connected to multiple clients 24(1), 24(2), . . . , 24(N) via a network 26. The clients 24(1)–24(N) send requests for data and/or services to the server 22 over the network 26. For discussion purposes, suppose the server 22 is configured as an Internet service provider, or "ISP". The ISP server 22 provides an email service 28 that handles electronic mail messages over the Internet 26 and a web service 30 that supports a web site accessible by the clients.

The network 26 is a medium with a predefined bandwidth capacity that is shared among the clients 24(1)–24(N). The network 26 is represented in FIG. 1 as a network pipeline to indicate a finite bandwidth capacity. The network 26 is representative of different network technologies (e.g., Ethernet, satellite, modem-based, etc.) and different configurations, including a LAN (local area network), a WAN (wide area network), and the Internet. The bandwidth capacity depends on the technology and configuration employed. For this example, suppose the network 26 has a total bandwidth capacity of 1,000 kilobits per second (Kb/s). Given this fixed bandwidth, the ISP administrator can allocate portions of the bandwidth for the various services 28 and 30. For instance, the ISP administrator might allocate 400 Kb/s to the email service 28 and 600 Kb/s to the web service 30.

As the clients 24(1)–24(N) access the services 28 and 30, they consume bandwidth on the network 26. The responses from the host server 22 also consumer bandwidth. When the allocated bandwidth for a service becomes saturated with client requests and server responses (such as the web service when bandwidth consumption reaches 600 Kb/s), some of the requests are either delayed in transmission or not delivered to the intended destination. Therefore, some form of request throttling mechanism is necessary to minimize network congestion and efficiently utilize the allocated network bandwidth.

In the case of multiple network servers or services executing on a single host computer system and sharing a fixed bandwidth communication link to the network, some network servers can disproportionately allocate this network bandwidth to their tasks, thereby excluding other concurrently executing network servers from performing their requested operations. In this case, the bandwidth throttling must be effected among the plurality of network severs which are concurrently executing on the host computer system.

It is therefore a problem to allocate bandwidth to the network server processes in a manner which enables the maximum number of requests to be served without network congestion and to also avoid impacting other network servers which may be executing on the same host computer system.

There have been many implementations of bandwidth allocation and congestion control schemes to address this problem. U.S. Pat. No. 4,914,650 discloses an integrated voice and data network which includes a multiplexer which functions to connect the host computer system with the network. The multiplexer is equipped with a voice queue for storing voice packets and a data queue for storing data packets. Both the voice packets and the data packets are transmitted uninterrupted for a respective predetermined interval, whose respective durations may be different. Signaling messages which are exchanged among the computer systems via the network preempt the voice and data transmissions to ensure that signaling messages are serviced with very low delay and zero packet loss in addition, the bandwidth allocated for each type of transmission, if unused, can be momentarily allocated to the other type of transmission to maintain a high level of service.

U.S. Pat. No. 5,313,454 discloses a feedback control system for congestion prevention in a packet switching network. Congestion control is achieved by controlling the transmission rate of bursty traffic when delay sensitive data is present for transmission. The bursty data is relatively insensitive to delay and can be queued for a reasonable period of time. Data indicative of the queue length is broadcast via the network to the destination node where it is processed and a control signal returned to the originating node to regulate the rate of transmission of the bursty data.

U.S. Pat. No. 5,359,320 discloses a scheduling mechanism for a network arbitration circuit in a broadcast network environment. The scheduling mechanism delays the arbitration circuit from seeking access to the network if the network traffic exceeds a first predetermined threshold and the local traffic in the node exceeds a second predetermined threshold. This scheduling mechanism therefore responds to both local and global congestion to throttle the production of new requests.

U.S. Pat. No. 5,432,787 discloses a packet switching system which appends a parity packet to each predetermined number of data packets. The number of data packets which are transmitted before the parity packet is appended thereto is a function of the network traffic and the measured network error rate.

U.S. Pat. No. 5,477,542 discloses a packet switching network which interconnects a plurality of terminal stations for transmitting video and voice data packets. The terminal stations which are operating in the receive mode transmit control signals to the associated transmitting terminal stations to indicate the amount of delay that the received packets have experienced in traversing the network. If the delay exceeds a predetermined threshold, the video packets are delayed and the voice packets are preferentially transmitted, since the voice packets are more sensitive to transmission delays.

Thus, there are numerous existing network congestion control mechanisms available to regulate the transmission rate of data through a network. However, the common thread in all of these systems is that a single control mechanism is provided to effect the desired congestion control. These control schemes are typically binary in nature, being either active or disabled. There is presently no known hierarchical network congestion control system which differentially responds to various levels of congestion. Furthermore, these congestion control schemes operate without regard for the nature of the processes that are extant on the network servers.

Additionally, FIG. 2 shows an example in which the ISP 22 supports multiple domains 32(1)–32(M) on the same web service 30. For instance, it is not uncommon for an ISP to support thousands of domains on the same web service. To the client, however, each domain functions as its own service as if running on its own HTTP (Hypertext Transfer Protocol) server on its own machine. Hence, the ISP 22 is effectively running multiple "virtual services" on multiple "virtual" HTTP servers, all from the same web service on the same machine. In such cases, network bandwidth control cannot be limited to applying globally to all the virtual servers. The all-or-nothing approach is unacceptable because the administrator often desires to designate some virtual services as more or less critical than others.

SUMMARY

An adaptive bandwidth throttling system of the present invention provides a hierarchically organized response to network congestion to escalate the actions taken to mitigate the traffic presented to the network in response to various levels of congestion. The bandwidth throttling system operates on a host computer system to allocate bandwidth to the network servers which are executing on the host computer system as a function of system administrator defined thresholds. The management of the plurality of network servers can be independent of each other, or may be coordinated, as the system administrator deems appropriate. In addition, the bandwidth throttling system can customize the system response as a function of the specific network process which is being regulated. Thus, the throttling mechanism can be crafted to correspond to unique needs of the various network servers.

The bandwidth throttling system implements a graceful diminution of services to the clients by implementing a series (at least two) of successively significant bandwidth throttling actions in response to a corresponding one of a plurality of thresholds of increasing magnitude being exceeded. For example, the bandwidth throttling system can delay a first class of services provided by a network server in response to the effective bandwidth utilized by this network server exceeding a first threshold. If the demand for the bandwidth by this network server exceeds a second threshold, the bandwidth throttling system escalates the throttling response and blocks the first class of services from execution and can also concurrently delay execution of a second class of services. The second level of response alternatively can include blocking only selected members of the first class of services and delaying additional services, previously not impacted by the bandwidth throttling process. The implementation of the throttling process can be varied, to include additional levels of response (>2) or finer gradations of the response, and to include subsets of a class of services. In addition, the threshold levels of bandwidth used to trigger the throttling response can be selected as desired by the system administrator. Typically, once the effective bandwidth utilization is approximately equal to the allocated bandwidth for the network server, the first level of the hierarchical bandwidth throttling is activated. The second level of the hierarchical bandwidth throttling is activated once the effective bandwidth utilization exceeds the allocated bandwidth for the network server by greater than a predetermined amount.

By implementing a hierarchical response to excessive network traffic, the impact on the various network services are minimized. The ability to customize the bandwidth throttling to specific subclasses of services enables the system to impact the services which are deemed by the system administrator to be of the lowest priority and/or whose reduction of service levels has the most beneficial effect on the network. Thus, the adaptive bandwidth throttling system provides a graduated throttling process to incrementally reduce the demand for network bandwidth without disrupting the provision of desired network services.

DETAILED DESCRIPTION

Network servers are processes which execute on a host computer system and which function to serve requests for service received from remote computer systems. The host computer system providing the requested service is typically termed the server. The remote computer system initiating the request is termed the client. The data exchanged between the host and remote computer systems is transmitted in units termed packets, each of which consists of at least one byte of data. The allocation of work between the client and server typically comprises a client process requesting a server process to read and write identified data files. The data files as well as the request and response messages are transmitted via the medium of the network which interconnects the computer systems on which the client and server processes execute.

The processing of a client originated service request begins with the network server receiving one or more request packets from the client via the network. Upon receipt of the request, the network server parses the request contained in the request packets, processes the request and responds by transmitting one or more response packets to the client via the network. If the network becomes saturated with data transmissions, some of the request and/or response packets may not be delivered to their intended destination. It is possible that a host computer may be running a plurality of network servers, thus limiting the processing resources which are available for any of the plurality of network servers. In such a scenario, control of the amount of the network bandwidth used by any one network server allows both that server as well as the other servers to perform more efficiently.

System administrators manage the network servers by utilizing the information that the administrators have collected regarding the processing requirements of the various services available from the network servers, as well as the requirements of the typical clients. In particular, some network services generate data which is intolerant of transmission delays while other network services generate data which is relatively delay insensitive. For example, bursty data is relatively insensitive to delay and can be queued for a reasonable period of time. In a combined voice-video data transmission system, video packets can be delayed while the voice packets are preferentially transmitted, since the voice packets are more sensitive to transmission delays than the video packets. In addition, some services are more response critical, having a higher priority than others. Using this data, as well as information regarding the data transmission patterns of existing systems, the administrator can specify resource usage for the plurality of network servers extant on the host computer system.

Figure 1:
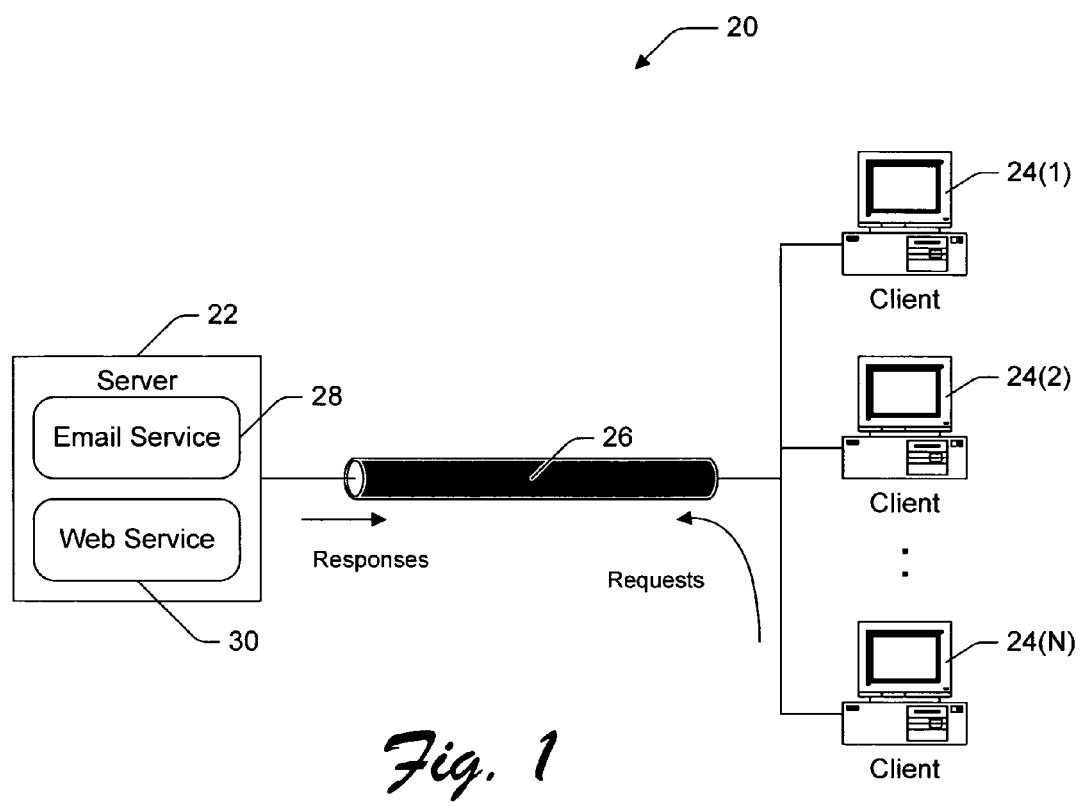
FIG. 1 is a diagrammatic illustration of a host computer network system, which is used to illustrate the present state of the art.
Figure 2:
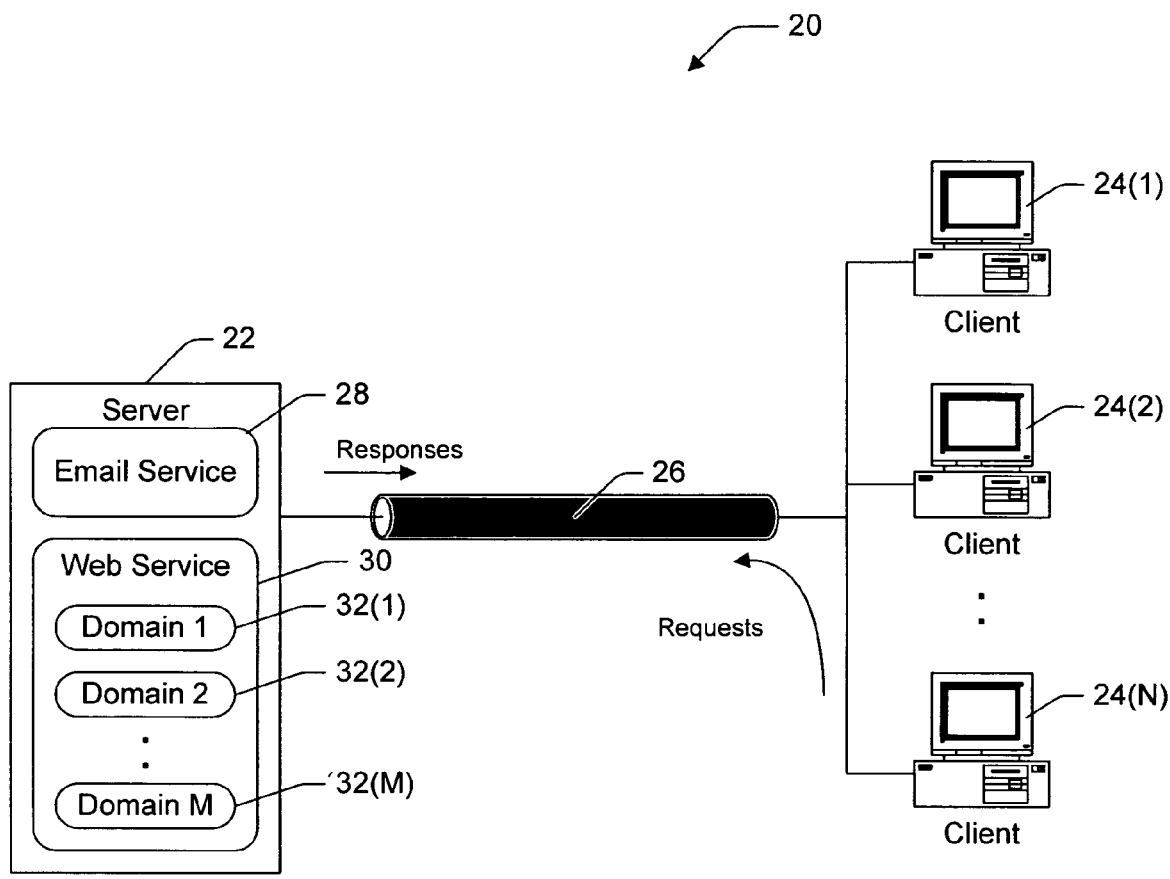
FIG. 2 is a diagrammatic illustration of the host computer network system implemented with multiple "virtual servers" supported by a single service on a single server machine.
Figure 3:
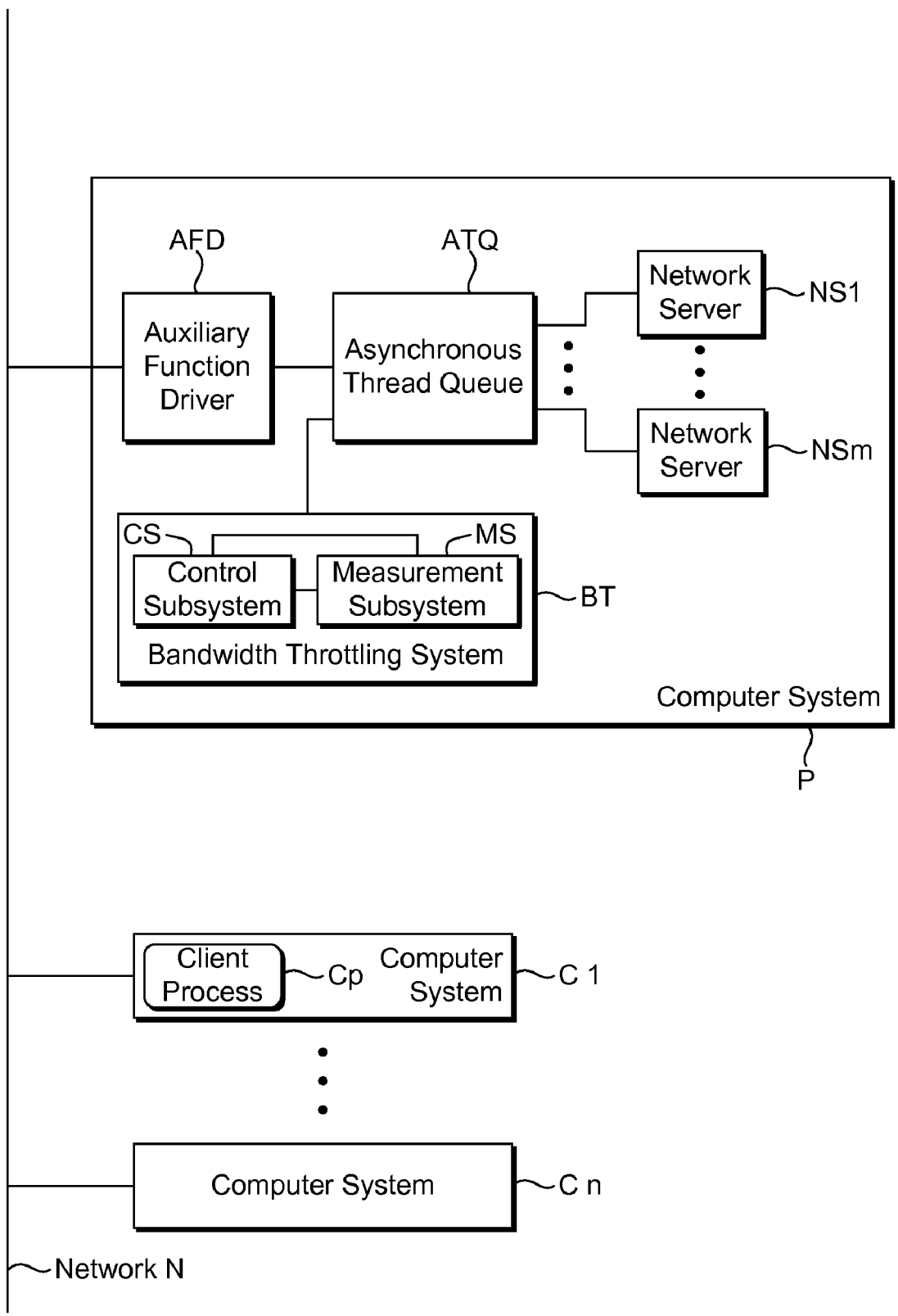
FIG. 3 illustrates in block diagram form the overall architecture of the adaptive bandwidth throttling system and an environment in which it operates.
Figure 4:
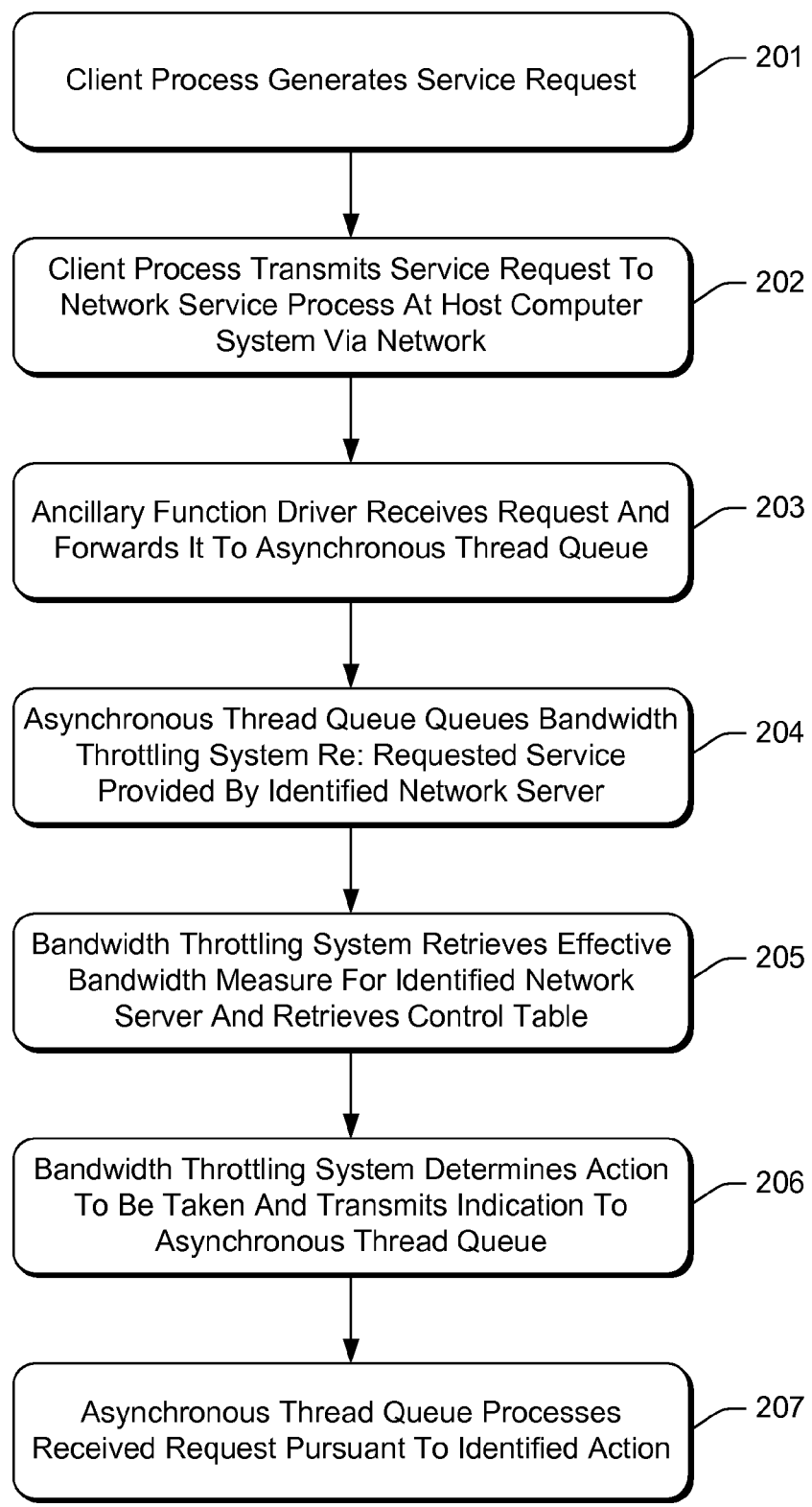
FIG. 4 illustrates in flow diagram form the operation of the overall system, including the adaptive bandwidth throttling system, in responding to service requests.
Figure 5:
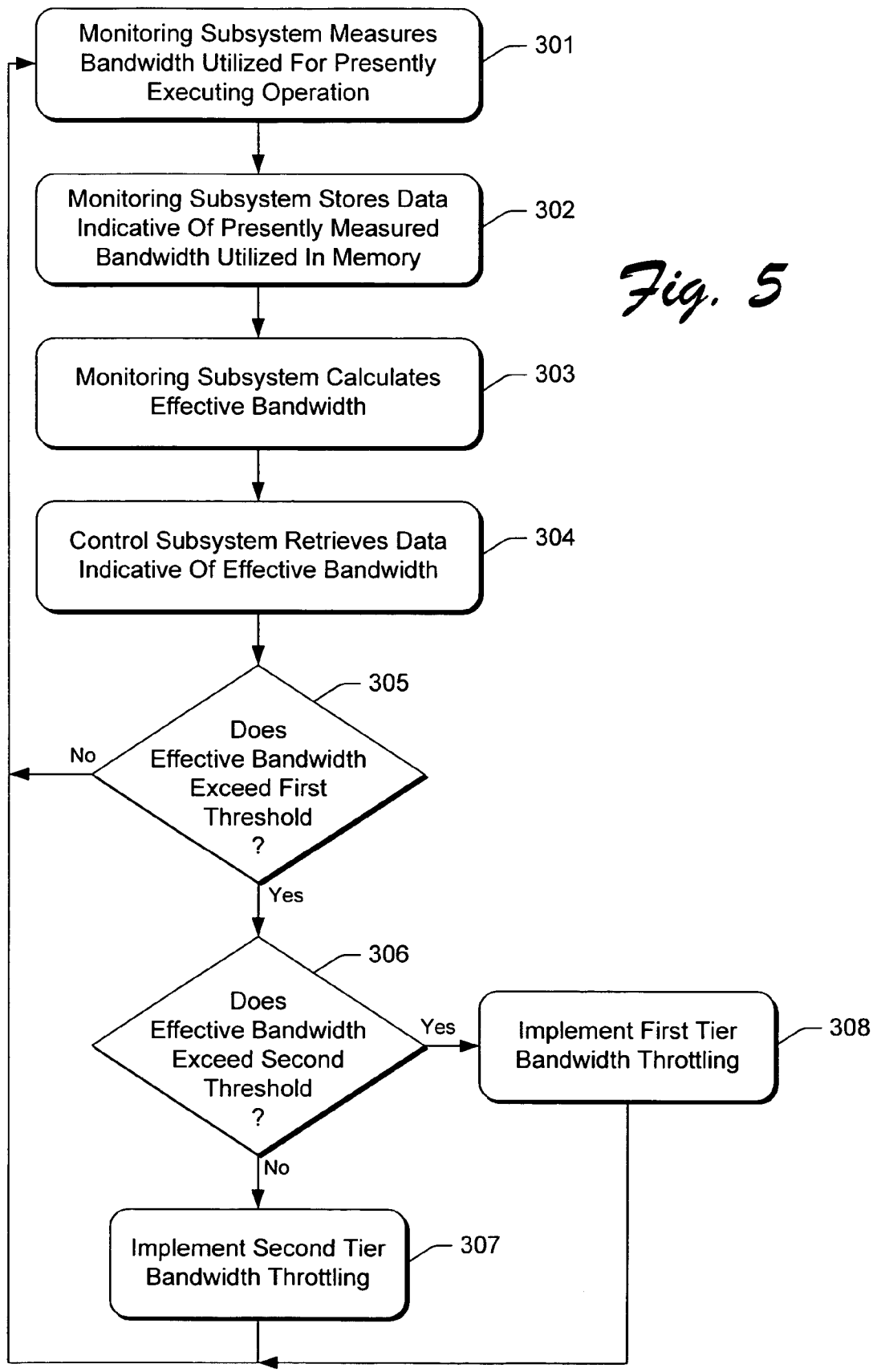
FIG. 5 illustrates in flow diagram form the operation of the adaptive bandwidth throttling system.

FIG. 3 illustrates in block diagram form the overall architecture of the adaptive bandwidth throttling system BT and an environment in which it operates, while FIGS. 4 and 5 illustrate in flow diagram form the operation of the adaptive bandwidth throttling system BT. The adaptive bandwidth throttling system of the present invention is described as implemented in software, although this system can alternatively be implemented as hardware elements or a combination of hardware and software elements. The adaptive bandwidth throttling system functions to limit the bandwidth usage of each of the plurality of services provided by the plurality of network servers NS1–NSm extant on the host computer system P to the allocated maximum network bandwidth. This control is architected to achieve the minimum impact on the network servers NS1–NSm while concurrently having the maximum impact on network congestion. In selecting an implementation of a bandwidth control mechanism, it is important to note that once a network service initiates a response process, that effort is lost if the response is not executed to completion. Therefore, bandwidth throttling procedures should terminate a service before substantial processing effort is expended. In addition, the typical client-server interaction operates on a request-response paradigm. In particular, the client transmits a request to the server and the only communication that is received by the client is the response to the request. There is no interprocess communication. Thus, rejecting and/or delaying requests typically results in a subsequent retry by the requesting client process, which consumes both processor and network resources, although in a time delayed manner. The client process can continue to send requests to an overloaded server without the server being capable of throttling this request process. An alternative interprocess communication scheme enables the server to notify the client of the server condition, thereby providing feedback to the requesting client to terminate future requests until the overload is cleared. The adaptive bandwidth throttling system of the present invention is operable in both of these environments.

The adaptive bandwidth throttling system BT is based on a feedback system that continuously monitors the bandwidth consumed by each network server NS1–NSm and initiates action when a network server reaches the threshold defined by the allocated network bandwidth for that network server. In particular, the bandwidth throttling system BT executes as a process on the host computer system P. The host computer system P contains at least one and more typically a plurality of network servers NS1–NSm which concurrently execute as independent processes. The host computer system P is connected via an auxiliary function driver AFD to a physical network N which interconnects the host computer system P to one or more remote computer systems C1–Cn, each of which have operational thereon a plurality of client processes (only client process CP is illustrated for the sake of simplicity), each of which generate the service request packets. An asynchronous thread queue ATQ interconnects the network servers NS1–NSm, the bandwidth throttling system BT and the ancillary function driver AFD. The asynchronous thread queue ATQ performs the input and output operations with respect to the connected network N by providing functions to read, write and transmit data files over network connections using the sockets capability of the host computer system P. The asynchronous thread queue ATQ communicates with the ancillary function driver AFD and the windows sockets driver (not shown) resident on the host computer system P to perform the required input and output operations over the network N.

FIG. 4 illustrates, in flow diagram form, an example of the basic operation of client-server communications in the context of the bandwidth throttling system BT. At step 201, the client process CP resident on remote computer system C1 generates a request for a network service, which network service is provided by a network server NS1 which is executing on the host computer system P. The generated request is processed at step 202 into a series of request packets and transmitted via network N to the host computer system P attached to network N. The request transmission is accomplished in a manner which is well known, and the request can be addressed specifically to the network server NS1 on host computer system P or the request can be addressed via use of a mnemonic which identifies a service, which can be provided by any available one of a plurality of host computer systems which are connected to the network N. The service request transmitted over the network N is received from the client process CP at step 203 by the ancillary function driver AFD and forwarded to the asynchronous thread queue ATQ. The asynchronous thread queue ATQ queries the bandwidth throttling system BT at step 204 to ensure that the requested operation is permitted for the identified network service. This determination is made at step 205 where the bandwidth throttling system BT retrieves the effective bandwidth measure for the identified network server NS1 and compares this value with data stored in a control table which is indicative of the network bandwidth allocated to this network server NS1. At step 206, the bandwidth throttling system BT transmits an indication of the determined action to be taken to the asynchronous thread queue ATQ which processes the received request at step 207.

If the requested operation is permitted, the asynchronous thread queue ATQ enables the operation to execute. If the requested operation is not permitted, the asynchronous thread queue ATQ regulates the operation pursuant to the control procedure indicated by the bandwidth throttling system BT. In particular, operations that are designated as rejected are prevented from proceeding and a control packet can be returned to the requesting client process CP via the network N to indicate that the requested service is unavailable at this time. If the requested operation is designated in the delay category, the asynchronous thread queue ATQ stores the received request and returns a control packet to the requesting client process CP to indicate that the operation is pending.

For every operation which is allowed to execute, the asynchronous thread queue ATQ transmits data indicative of the number of bytes processed by execution of the requested operation to the measurement subsystem MS of the bandwidth throttling system BT. The measurement subsystem MS uses this received data to update the bandwidth usage data stored in the bandwidth throttling system BT and periodically computes the effective bandwidth for this network server at regular intervals. The control subsystem CS of the bandwidth throttling system BT uses the computed effective bandwidth to update its internal control tables and thereby regulate the operation of the network servers NS1–NSm.

FIG. 5 illustrates in flow diagram form the process used by the bandwidth throttling system BT to regulate the operation of the various network servers NS1–NSm extant on the host computer system P. The bandwidth throttling system BT monitors the operations performed by the asynchronous thread queue ATQ to ascertain the bandwidth utilized by each of the network servers NS1–NSm. The bandwidth throttling system BT consists of two subsystems: a measurement subsystem MS to measure the bandwidth usage for each of the network servers; a control subsystem CS which applies feedback based control to the asynchronous thread queue ATQ to limit the bandwidth used by each network server NS1–NSm. The network operations which are monitored by the bandwidth throttling system BT are: receive, send, and transmit file. The measurement subsystem MS, at step 301, monitors not only the operations which are performed by each network server NS1–NSm, but also the data flow rate for each operation, in the form of effective real time bandwidth consumed. The effective real time bandwidth is determined by calculating the bandwidth for each operation which is performed and averaging the bandwidth utilization over the last n operations performed. To limit the complexity, the monitoring subsystem MS does not maintain a complete history of all operations, but instead maintains a histogram of bandwidth values for the last most recent n time intervals. These values are accumulated by time stamping the start and end times of each operation. If the operation proceeds to completion, the monitoring subsystem MS calculates the bandwidth by dividing the bytes transferred during the operation by the time interval duration. The resultant bandwidth value is stored, at step 302, in the n last time interval histogram, which set of values is used at step 303 to periodically compute an effective bandwidth for this network server.

The control subsystem CS, at step 304, receives the effective bandwidth data generated by the measurement subsystem MS and uses this information to regulate the operation of the various network servers. In operation, the control subsystem CS invokes the measurement subsystem MS to compute the effective bandwidth, M, for each network server. The control subsystem CS of the bandwidth throttling system BT uses three classes of operations to characterize the nature of the operation: Read (R), Write (W), and Transmit (T); in addition to two subclasses: Large (L) and Small (S) to denote the size of the data involved. The list of monitored operations is therefor: Read (R), Write-Small (WS), Write-Large (WL), Transmit-Small (TS), and Transmit-Large (TL). The breakpoint between large and small data transfers is empirically determined and can differ for read and write operations, and can vary among the network servers NS1–NSm. With these categories, the allocated bandwidth for a particular network server, and the present effective bandwidth determined by the monitoring subsystem MS, the control subsystem CS determines whether it is safe (allow), marginally safe (delay) or unsafe (block) to perform a particular requested operation. This decision is based upon a set for factors: the specific nature of the operation, the dynamic behavior of the network server, the amount of processor and memory resources consumed by and required by the requested operation, the estimated and specified bandwidths. Thus, the operation of the adaptive bandwidth throttling system can be customized for the operating characteristics of the specific network server.

Tables A and B indicate two views of a typical list of the actions taken by the control subsystem CS for each of the identified operations at various levels of bandwidth consumption for one (NS1) of the plurality of network servers NS1–NSm operational on the host computer system P:

TABLE A

Control Table

|  | No Action Taken | Services Delayed | Services Blocked |
|---|---|---|---|
| M < B | R, WS, WL, TS, TL |  |  |
| M ≈ B | WS, WL, TS, TL | R |  |
| M > B | WS, TS | WL, TL | R |

TABLE B

Control Table

|  | Action | Threshold |
|---|---|---|
| M < B | Allow R, WS, WL, TS, TL | B − δ |
| M ≈ B | Allow WS, WL, TS, TL<br>Delay R |  |
| M > B | Allow WS, TS<br>Delay WL, TL<br>Block R | B + δ |

In particular, it is assumed that the identified network server is allocated a maximum bandwidth of B, with the computed effective bandwidth consumed being M. The responses by the control subsystem CS are listed across the top of Table A and consist of: no action taken, services delayed, and services blocked. Table B provides an alternative presentation of the information provided in Table A. In the first case illustrated in Tables A and B, the effective bandwidth consumed by the network server is less than the bandwidth (B) allocated for this network server by greater than a predetermined amount M>(δ). In this instance, at step 305, the control subsystem CS determines that the effective bandwidth does not exceed the bandwidth (B) allocated for the identified network server NS1 and no action need be taken, since there is sufficient bandwidth to perform all of the requested operations. The control subsystem CS therefore takes no control action, processing returns to step 301, and the measurement subsystem MS continues to measure the bandwidth consumed by the network server and keeps track of the effective bandwidth utilization.

In the second case listed in Tables A and B the first threshold (B−δ) is exceeded, and it is determined at step 305 that the bandwidth consumed by the network server is at or has begun to exceed the bandwidth (B) allocated for this network server (B−δ<M<B+δ). The control subsystem CS at step 306 determines whether the effective bandwidth has also exceeded the second threshold (B+δ). If not, control subsystem CS initiates the first level of the hierarchy of bandwidth throttling actions to regulate bandwidth usage to avoid increased bandwidth utilization at step 307 and processing then returns to step 301. This process represents a substantially proactive response to avoid serious problems which may be occasioned by inaction at this point in time. The control subsystem CS, in the example illustrated in Tables A and B, functions to delay all read operations (R) to limit bandwidth usage. Network servers receive requests from clients and act upon them. Therefore, limiting the number of requests in the request queue for a particular network server limits the bandwidth utilized by this network server. The delay of read operations provides time for the request traffic to abate without further action. This procedure "buys time" by delaying presently received read requests for execution at a later time, in anticipation that the network traffic will be at a reduced level as the delayed read operations are executed, thereby "smoothing out" the request workload. This process anticipates that the traffic is irregular and a peak load is simply a transient condition. In addition, the servicing of a read request typically results in a subsequent write and/or transmit file request, therefore delaying a read operation also further delays these subsequent write and/or transmit file request, having a compound effect.

In the third case listed in Tables A and B, the first threshold (B−δ) is exceeded, and it is determined at step 305 that the bandwidth consumed by the network server is at or has begun to exceed the bandwidth (B) allocated for this network server. The control subsystem CS at step 306 then determines whether the effective bandwidth has also exceeded the second threshold (B+δ). If so, the bandwidth utilized exceeds the bandwidth allocated for this network server(B) by greater than a predetermined amount (δ) and further corrective measures must be taken. Processing therefore advances to step 308 where the second tier of bandwidth throttling is activated and processing then returns to step 301. A significant impact on system performance is achieved by rejecting all read requests (R) and delaying a subclass of the previously enabled write (WL) and transmit (TL) requests. In particular, both large write requests (WL) and large transmit requests (TL) are now delayed. The read requests (R) are typically rejected by transmitting an indication to the requesting client that the server is busy or the network is busy. Blocking (delaying) large write and transmit requests delays their impact on the bandwidth and reduces bandwidth utilization quickly, since the delay of a few of these requests has far greater impact than rejecting read requests due to their processing and bandwidth intensive nature. The rejection of large write and large transmit operations may be counterproductive, since a significant amount of processing may have been expended when the bandwidth throttling system BT initiates the delay control process, which expended resources are recouped when the delay period is over. However, a further escalation of the control subsystem CS operation (not shown in Tables A and B) can be the rejection of large write and/or large transmit operations during a severe overload condition.

It Variations of the bandwidth throttling scheme illustrated in Tables A and B are possible, and this implementation is provided for the purpose of illustrating the hierarchical nature of the adaptive bandwidth throttling system BT and its adaptability to accommodate the needs of a particular host computer system P and the unique servers operational on the host computer system.

The adaptive bandwidth throttling system provides a hierarchically organized response to network congestion to escalate the actions taken to mitigate the traffic presented to the network in response to various levels of congestion. The bandwidth throttling system operates on a host computer system to allocate bandwidth to the network servers which are executing on the host computer system as a function of system administrator defined thresholds. The management of the plurality of network servers can be independent of each other, or may be coordinated, as the system administrator deems appropriate. By implementing a hierarchical response to excessive network traffic, the impact on the various network services are minimized. The ability to customize the bandwidth throttling to specific subclasses of services enable the system to impact the services which are deemed by the system administrator to be of the lowest priority and/or whose reduction of service levels has the most beneficial effect on the network. Thus, the adaptive bandwidth throttling system provides a graduated throttling process to incrementally reduce the demand for network bandwidth without disrupting the provision of desired network services. In addition, the bandwidth throttling system can customize the system response as a function of the specific network process which is being regulated. The throttling mechanism can be crafted to correspond to unique needs of the various network processes.

Figure 6:
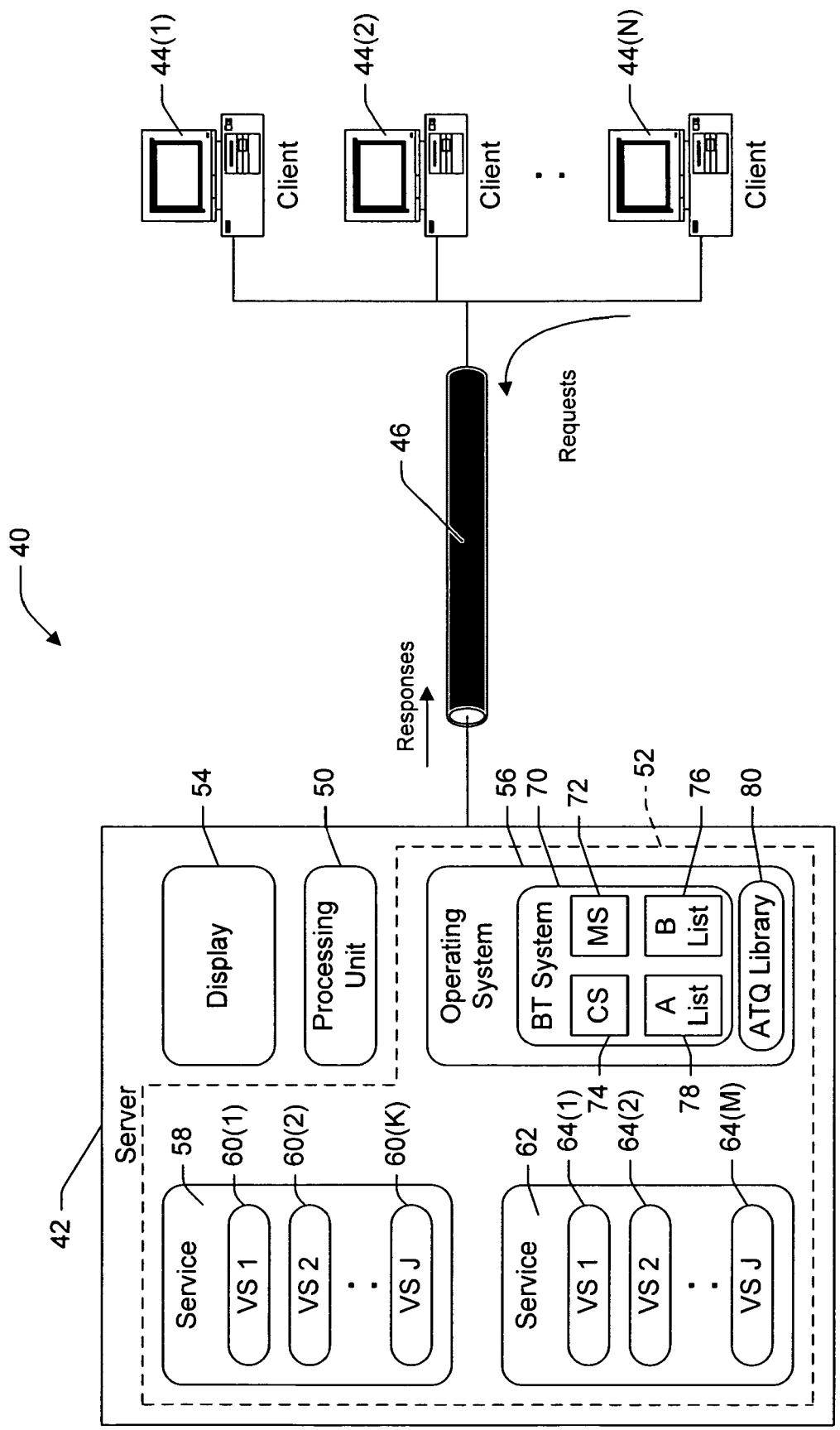
FIG. 6 is a diagrammatic illustration of a host computer network system having a server implemented with a bandwidth throttling system of this invention.

FIG. 6 shows the computer network system 40 having a host network server 42 connected to serve multiple clients 44(1), 44(2), . . . , 44(N) over a network 46. The network 46 is representative of many diverse network technologies (e.g., Ethernet, satellite, modem-based, etc.) and different configurations, including a LAN (local area network), a WAN (wide area network), and the Internet. For discussion purposes, the computer network system 40 is described in the context of the Internet whereby the host network server 42 is an Internet Service Provider (ISP) that provides services to the clients 44(1)–44(N) over the Internet 46. It is noted, however, that this invention may be implemented in other networking contexts, including LAN and WAN configurations.

The ISP network server 42 is connected to the Internet 46 via a data transmission network connection that has a predetermined fixed bandwidth capacity. The bandwidth is typically characterized in terms of kilobits per second or "Kb/s". The clients 44(1)–44(N) share the bandwidth when accessing the services provided by the ISP server 42.

The host network server 42 has a processing unit 50, a memory subsystem 52, and a display 54. The memory subsystem 52 includes both volatile memory (e.g., RAM) and non-volatile memory (e.g., ROM, hard disk drive, floppy disk drive, CD-ROM, etc.). The host network server 42 runs a network server operating system 56. In the preferred implementation, the operating system 56 is the Windows NT server operating system from Microsoft Corporation, which is modified to incorporate the bandwidth throttling system described below. As one example implementation, the host network server 42 is a microprocessor-based personal computer configured with the Windows NT server operating system. It is noted, however, that other server configurations (e.g., workstation, minicomputer, etc.) and other operating systems (e.g., a UNIX-based operating system) can be used to implement aspects of this invention.

The host server 42 supports one or more services, as represented by services 58 and 62 (e.g., also referred to as network servers above). Two example services are an email service and a web service. Each service 58 and 62 presents itself to the clients as multiple "virtual services", as represented by virtual services (VS) 60(1)–60(J) for service 58 and virtual services 64(1)–64(K) for service 62. Within the context of a web service, the virtual services correspond to different domains supported on the same web service. To the client, each domain appears as its own web service running on its own HTTP (Hypertext Transfer Protocol) server. In reality, the domain is simply one of many supported by the single web service on the same server. Hence, the host server 42 is said to support multiple "virtual services" or present multiple "virtual servers" using the same web service on the same machine.

Since the clients 44(1)–44(N) share the bandwidth capacity for the virtual services offered by the host server 42, there can be congestion at times whereby too many simultaneous client requests bombard the host server 42. To minimize congestion and promote efficiency, the host server 42 employs a bandwidth throttling (BT) system 70 that throttles requests in an effort to avoid bandwidth saturation. The bandwidth throttling system 70 is shown implemented as a software module incorporated into the operating system 56 as part of, for example, the Internet Information Services (IIS) component in the operating system. Alternatively, the BT system may reside as a separate component independent of the operating system. It is further noted that the BT system 70 can be implemented separately from the host server 42 to manage request traffic to the services supported on host server 42, as well as services supported on other servers (not shown).

The BT system 70 provides a global throttling approach that applies across us all of the services 58 and 62 supported by the host server 42. The global throttling technique imposes successively significant bandwidth throttling actions in response to increasing bandwidth consumption, as discussed above. For global throttling, the administrator defines one or more global bandwidth thresholds that must be surpassed to initiate some form of bandwidth throttling that applies to all incoming requests.

This invention concerns an improvement of the global bandwidth throttling system described in the above application. In addition to global throttling, the BT system 70 enables a finer grain control of the bandwidth on a per virtual service basis. That is, rather than applying global throttling control across all of the services, the BT system 70 also permits throttling control at the virtual service level. This empowers an ISP administrator to set and monitor different bandwidth thresholds for individual virtual services, and to manage the flow of requests to each virtual service independently of other virtual services.

The BT system 70 has a measuring subsystem 72 to measure the portion or amount of fixed bandwidth that is being presently used by each of the virtual services. In a preferred implementation, the control subsystem 72 tracks the bandwidth utilization on a per virtual service basis using multiple bandwidth throttling objects that are created to represent the virtual services. The bandwidth throttling objects are described in more detail below with reference to FIG. 8.

The BT system 70 has a control subsystem 74 to facilitate a throttling strategy that selectively throttles requests for the individual virtual services independently of one another on a per virtual service basis. The control subsystem 74 applies throttling actions to individual virtual services depending upon the level of bandwidth being consumed by that virtual service.

More particularly, the control subsystem 74 applies a first set of throttling actions to requests for a particular virtual service, say virtual service 60(1), if the presently used bandwidth measured for the particular virtual service 60(1) exceeds a first threshold. These throttling actions may include allowing certain types of requests (e.g., high priority requests) while delaying other types of requests (e.g., low priority requests), as prescribed by the administrator. The throttling actions imposed on virtual service 60(1) are independent of any throttling actions that may be imposed on other virtual services 60(2)–60(J) and 64(1)–64(K) so that only requests bound for the virtual service 60(1) are affected by the actions.

If the I/O activity for the virtual service 60(1) continues to rise and the bandwidth used by the virtual service 60(1) exceeds a second threshold, the control subsystem 74 applies a second, more restrictive set of throttling actions to the requests for that virtual service. In this case, the throttling actions may include allowing only requests designated by the administrator as high priority, delaying requests designated as medium priority, and rejecting requests designated as low priority.

The BT system 70 has a born or "B" list 76 and an active or "A" list 78 to help manage the bandwidth throttling objects. In general, the BT objects are created for each virtual service. A pointer to a BT object is placed on the born list 76 when the BT object is created. When the virtual service is handling client requests, the associated BT object is also placed on the active list 78 to indicate that the virtual service is presently receiving or responding to requests. The active list is thus a subset of the born list.

The purpose of keeping an active list is to prevent unnecessary bandwidth calculations for BT objects that are not active. For an ISP that supports thousands of domains, for example, it is anticipated that only a fraction of the domains (e.g., ten percent) will be active at any one time. The BT objects for frequently visited web sites, such as ESPN® Sports Zone or MSNBC, might always be active, whereas BT objects associated with rarely visited web sites are seldom active. Only the BT objects on the active list are routinely updated as to their presently used bandwidth. The BT objects on the born list, but not on the active list, are passed over as the bandwidth calculations are unnecessary for these objects.

In the example implementation, the BT system 70 utilizes a asynchronous thread queue (ATQ) support library 80 provided by the Windows NT operating system to handle requests. The ATQ library 80 enables asynchronous input and output operations.

Figure 7:
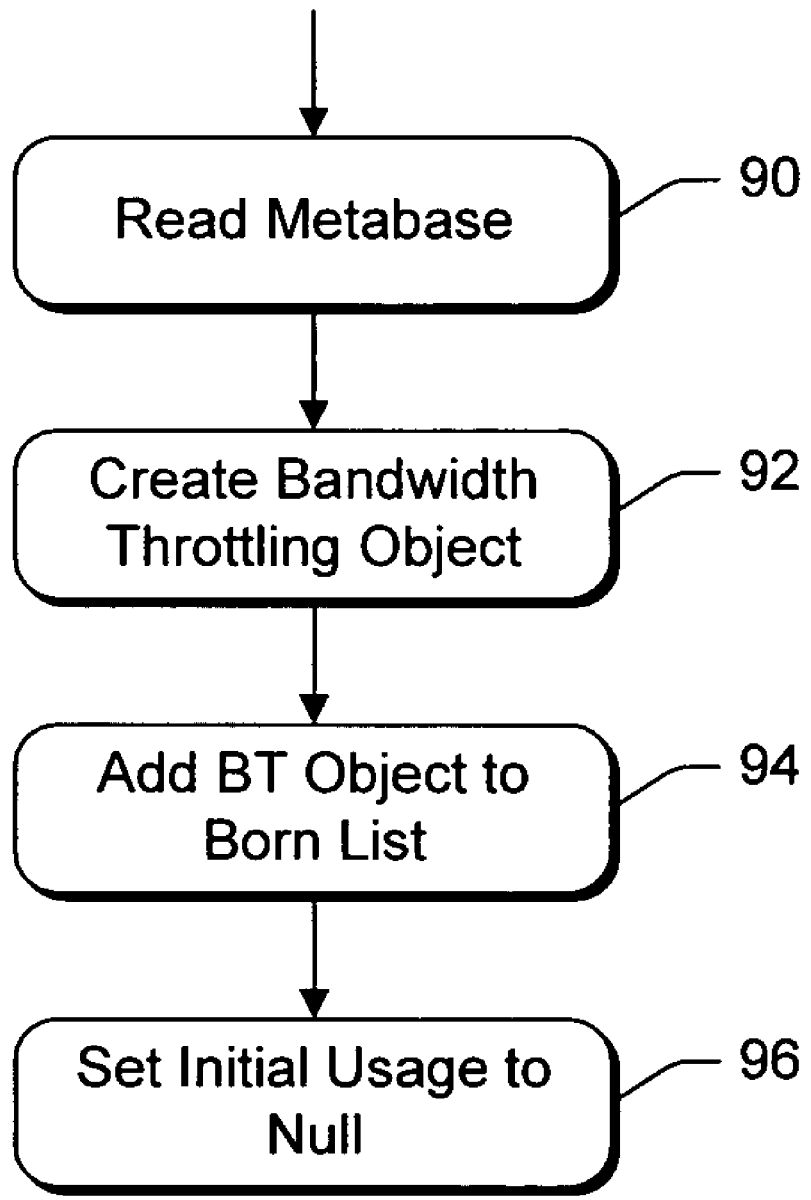
FIG. 7 is a flow diagram showing steps in a method for initializing the bandwidth throttling system.

FIG. 7 shows steps for initializing the BT system 70 in preparation for handling client requests. This start sequence occurs when the operating system and Internet Information Service (IIS) component is booted. At step 90, the IIS reads a metabase maintained on non-volatile memory to obtain content data used to construct the bandwidth throttling objects. The metabase contains data on any virtual service that has previously registered with the operating system. The metabase data includes the names of the virtual services, the bandwidth thresholds for the virtual services, and the like.

With this information, the control subsystem 74 creates a BT object for each virtual service (step 92 in FIG. 7). The BT object is stored at the server and used to track the bandwidth performance of the associated virtual service. The control subsystem 74 adds the BT object to the born list 76 (step 94 in FIG. 7). The initial bandwidth measurement for the BT object is then set to null as no I/O activity has yet taken place (step 96 in FIG. 7).

Figure 8:
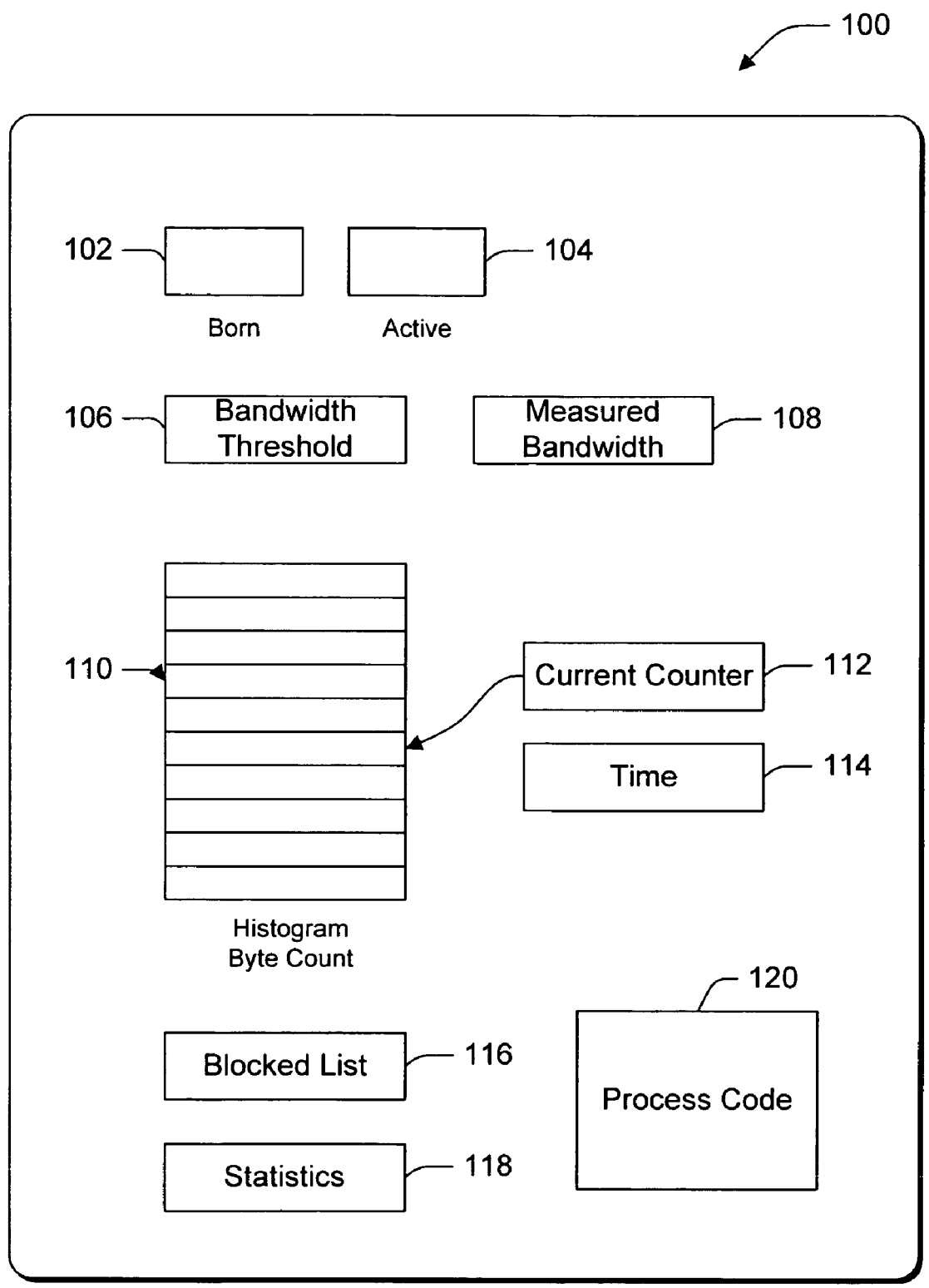
FIG. 8 is a diagrammatic illustration of a bandwidth throttling object that is stored at the server and utilized by the bandwidth throttling system to track bandwidth performance of individual virtual services.

FIG. 8 shows a bandwidth throttling object 100 in more detail. The BT object 100 has born and active fields 102 and 104 that facilitate placement of pointers to the BT object 100 onto the born and active lists 76 and 78. The BT object 100 further has a threshold data field 106 to hold a bandwidth threshold specified by the administrator for the associated virtual service. The bandwidth threshold 106 indicates a level of I/O activity for an associated virtual service that is effective to trigger throttling actions on requests for the associated virtual service. The thresholds are set by the administrator in a manner to avoid real or potential congestion that may occur if no throttling action is taken.

The BT object 100 has a measured bandwidth data field 108 to hold a measured bandwidth that is presently being used by the associated virtual service to accommodate the I/O activity. The measuring subsystem 72 routinely measures the bandwidth used by the virtual service and stores this value in the measured bandwidth data field 108. One specific technique for determining the presently consumed bandwidth is described below with reference to FIGS. 8 and 9. This technique involves statistical analysis using a histogram of I/O activity. More particularly, the measuring subsystem counts the number of bytes passed to or from the virtual service during fixed time intervals. To support this measurement technique, the BT object 100 includes a histogram data field 110 to hold data indicative of the I/O activity for the virtual service measured at fixed time intervals. A counter 112 maintains a pointer to a memory cell in which the I/O count for the current interval of the histogram is to be stored. A time field 114 keeps a time value that is used in calculating an average bandwidth consumption over the multiple histogram intervals.

The BT object 100 further includes a blocked list data field 116 to hold a collection of requests for the virtual service that have been temporarily delayed as a result of a throttling action. The BT object 100 also keeps statistics 118 relevant to the bandwidth maintenance. These statistics might include information such as the I/O activity, when or how often thresholds are exceeded, when and what throttling actions are imposed on the virtual service (i.e., how many requests for the virtual service are being allowed, blocked, or rejected), and so forth. The statistics 118 can be presented to the administrator on demand, and displayed in a user interface on the display 54 to assist the administrator in analyzing performance of individual virtual services.

The BT object 100 contains process code 120 for performing methods used in the control and throttling of bandwidth. Table 1 shows an example set of methods that might be contained in the BT object 100.

TABLE 1

| Method | Description |
|---|---|
| SetThreshold | Set the bandwidth threshold for this object. When measured bandwidth exceeds this value, the control system 74 will take appropriate throttling action. |
| GetThreshold | Query the currently set bandwidth threshold. |
| UpdateBytesXfered | Called when bytes have been transferred and the transfer pertains to this bandwidth throttling object. |
| GetStatistics | Query bandwidth maintenance statistics. |
| UpdateBandwidth | Update the internally maintained bandwidth measurement for this object. |

Establishing individual BT objects 100 for each virtual service is advantageous because the administrator can set bandwidth thresholds for on a per virtual service basis. Thus, some virtual services might be allocated more bandwidth, or a higher priority of usage, that other virtual services. For example, suppose the ISP server supports three virtual services. Two of the virtual services pay the same amount for a basic web site, while the third virtual service pays a premium for a premier web site. The administrator might wish to set the threshold(s) for the premier virtual service at a higher level than the basic virtual service. In this manner, throttling actions will be activated first for the basic virtual services to control request traffic before any throttling action is initiated for the premier virtual service, thereby allowing the I/O activity to continue on the premier virtual service unimpeded.

Figure 9:
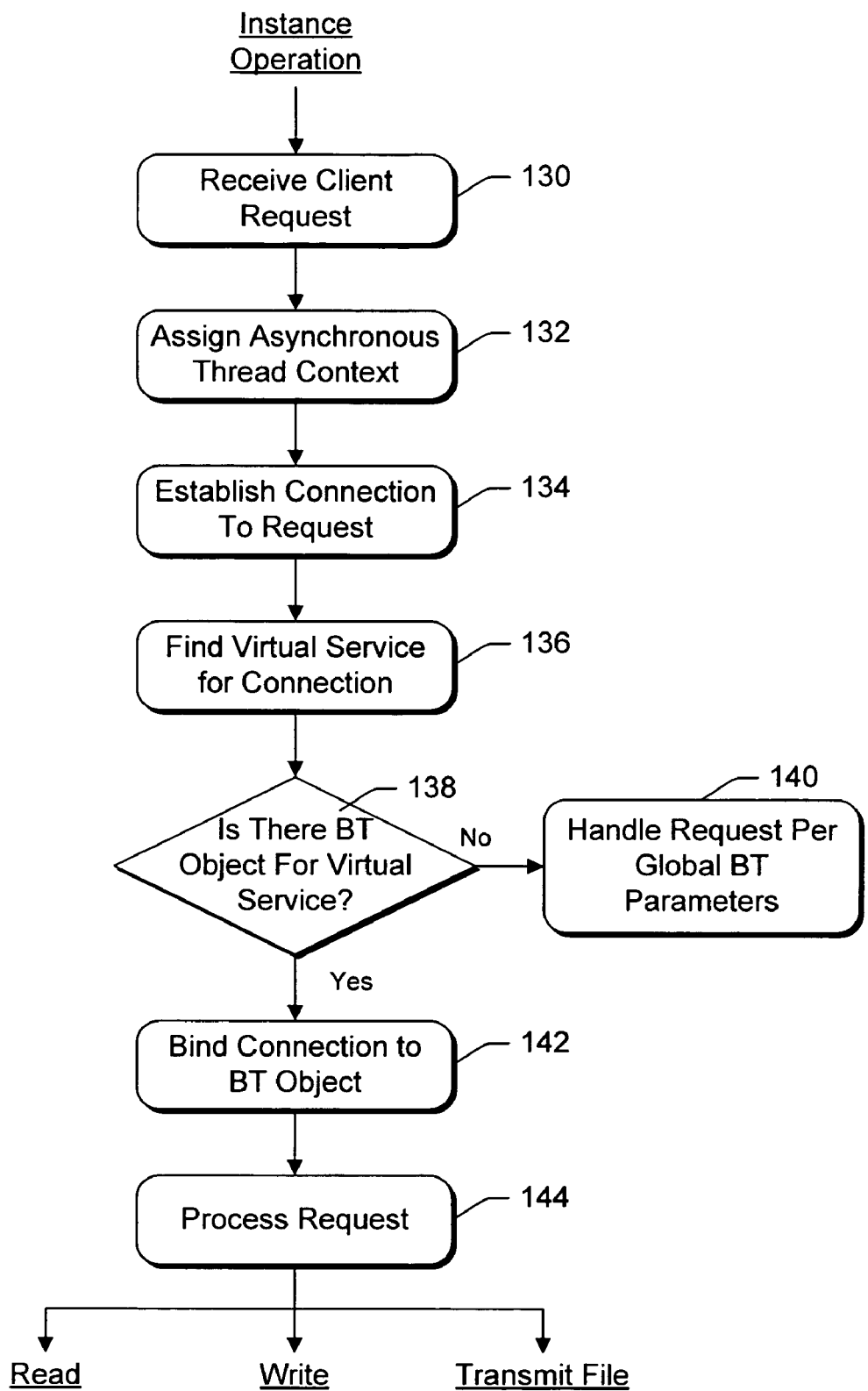
FIG. 9 is a flow diagram showing steps in a method for handling client requests at the ISP server.

FIG. 9 shows steps for handling client requests at the ISP server 42. At step 130, the ISP server 42 receives from a client a request for a virtual service supported by the server. In the context of a web site, the request might be in the form of a universal resource locator (URL), such as "http://www.microsoft.com/". The ISP server 42 assigns an asynchronous thread Context (ATQ Context) from the ATQ library 80 to handle the incoming request (step 132 in FIG. 9). The ATQ Context interconnects the BT system with the appropriate virtual service. The ATQ library also supports the I/O operations with respect to the network by providing functions to read, write, and transmit data files over the network connection using socket capability available at the server (necessary network access data including socket are stored in the ATQ Context).

Part of the setup of the ATQ context is to establish a connection (step 134). This entails specifying a connection callback that the ATQ library will call when a request arrives. The ATQ passes completion information, status information, and a special context value to the callback. All subsequent asynchronous I/O operations between the client and ISP utilize the special context value to allow the ATQ library to operate properly and independently of other ATQ contexts that may be active.

The ISP server 42 parses the client request to identify the virtual service sought by the request (step 136 in FIG. 9). The BT system 70 next determines whether a BT object 100 exists for the virtual service (step 138). For this determination, the BT system 70 checks the born list 76 to see if any BT object has been created for the requested virtual service. If a BT object does not exist (i.e., the "no" branch from decision step 138), the BT system 70 handles requests for the virtual service using the global bandwidth throttling parameters (step 140). Conversely, if a BT object exists for the virtual service (i.e., the "yes" branch from decision step 138), the BT system 70 binds the client connection with the BT object (step 142 in FIG. 9). The BT object remains bound to the client connection until the client is finished with its requests.

For purpose of continuing discussion, assume that a BT object is located and bound to the connection. Next, the ISP server processes the request (step 144 in FIG. 9). The request is characterized as one of three types: read, write, and transmit file. A read request is one in which the server is waiting to read data from the client (or the server seeks data from the client). A write request seeks to write data from the server to the client. A transmit file request asks the ISP to download a document or file, such as occurs usually during an initial HTTP GET operation.

Figure 10:
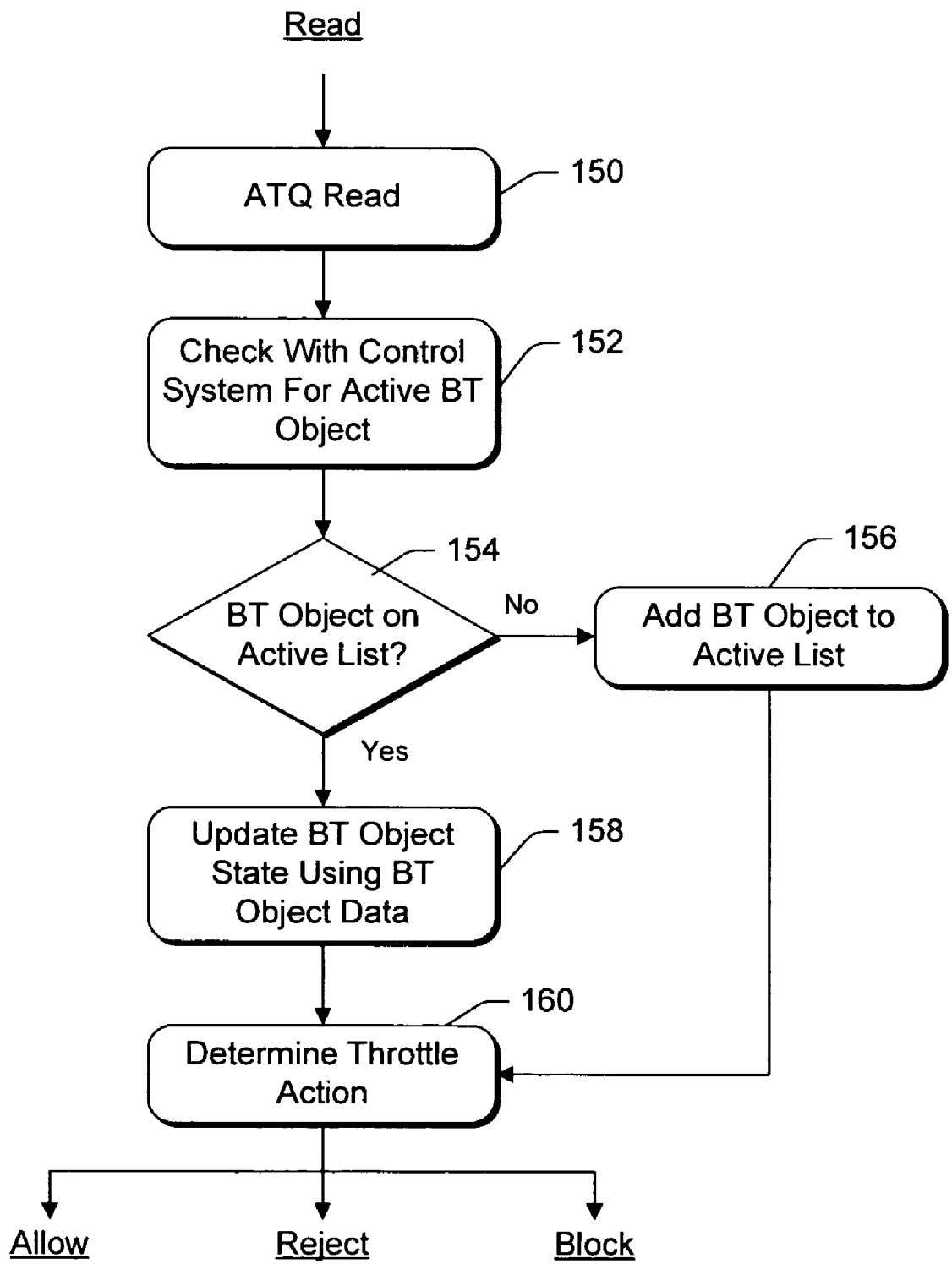
FIG. 10 is a flow diagram showing steps in a method for processing a read operation directed to a virtual service.

FIG. 10 shows steps for processing a read request. It is noted that similar steps are taken for a write request and a transmit file request. The ATQ uses the context value and invokes the operating system to perform a read operation (step 150 in FIG. 10). The service sets up a callback function in the ATQ Context to be called when the operation completes. The ATQ checks with the control subsystem 74 to determine whether the BT object associated with the requested virtual service is on the active list 78 (steps 152 and 154). If not (i.e., the "no" branch from step 154), the control subsystem 74 adds the BT object 100 to the active list (step 156 in FIG. 10). On the other hand, if the BT object 100 is on the active list 78 (i.e., the "yes" branch from step 154), the control subsystem 74 updates the BT object state (step 158 in FIG. 10).

At step 160, the control subsystem evaluates a current set of throttling actions to determine whether the read operation for the requested virtual service can be performed. The evaluation is based on the present I/O activity for the virtual service as maintained in the BT object for that virtual service. More specifically, the control subsystem 74 extracts the measured bandwidth 108 and the bandwidth threshold 106 from the BT object 100 and compares the two values. Different throttling actions are taken depending upon the comparison results.

The BT system 70 preferably employs an adaptive, hierarchical throttling strategy. In one preferred technique, the administrator establishes threshold zones based on the threshold T and an offset value $\delta$ above and below the threshold T (i.e., T±$\delta$). The result is a three-zone control area subdivided by two thresholds (i.e., T−$\delta$ and T+$\delta$).

Figure 11:
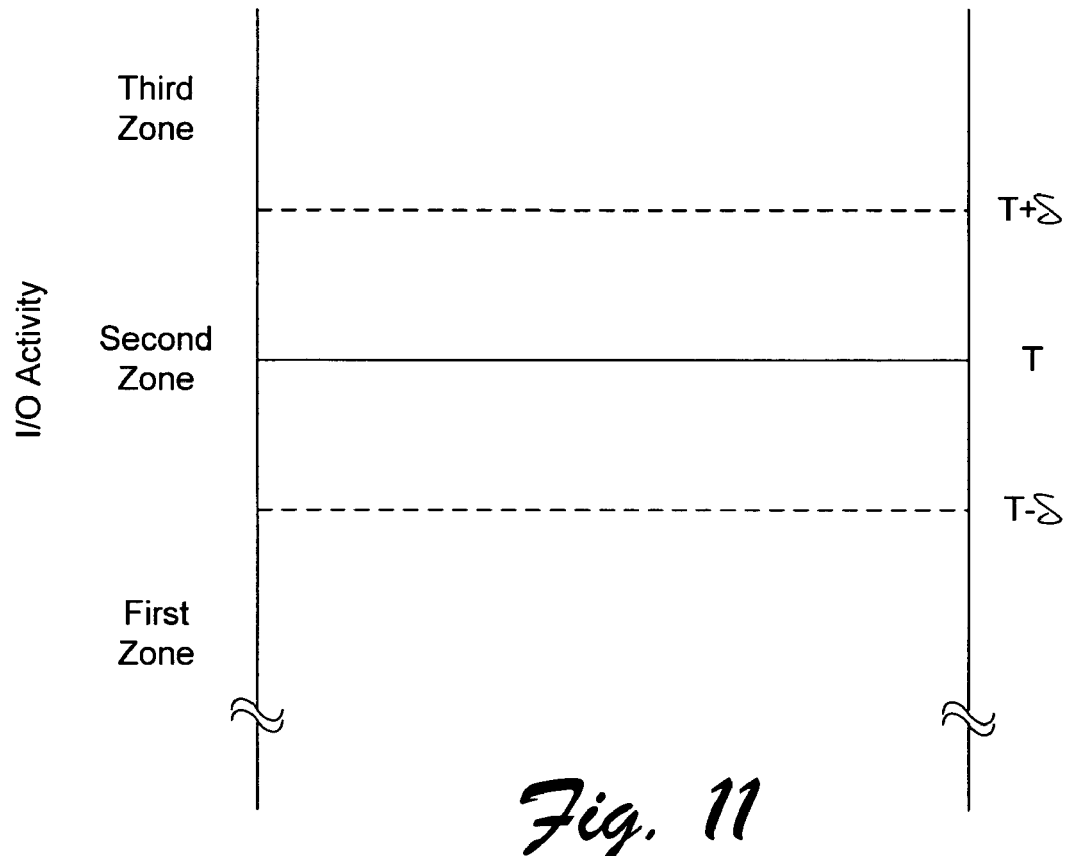
FIG. 11 is a diagrammatic illustration of a throttling strategy which uses a threshold and offset value to establish a tiered approach to invoking various sets of throttling actions depending upon the I/O activity.

FIG. 11 illustrates the tiered control strategy. The vertical axis represents bandwidth usage, measured in terms of I/O activity as the number of bytes being passed to or from a virtual object within a predefined timeframe. If the bandwidth being used by the virtual service is less than the first threshold (i.e., the first zone), no throttling actions are taken. If the bandwidth usage exceeds the first threshold but is less than the second threshold (i.e., the second zone), a first set of throttling actions is taken. If the bandwidth usage exceeds a second threshold higher than the first threshold (i.e., the third zone), a second set of throttling actions is taken.

The different sets of throttling actions affect operations differently depending upon a plan devised by the administrator. In setting the actions, the administrator takes into account the nature of the operation, the dynamic behavior of the network server, the amount of processor and memory resources consumed by and required by the requested operation, and the estimated and specified bandwidths. As one example, suppose the control subsystem characterizes all operations as either read (R), write (W), or transmit (T). In addition, the control subsystem provides two subclasses large (L) and small (S) to denote the size of the data involved in handling the three operations. Accordingly, the possible operations are read (R), write-small (WS), write-large (WL), transmit-small (TS), and transmit-large (TL).

In this example, there are three possible actions: allowing a request to proceed, rejecting the request, and blocking (i.e., delaying) the request until a later time. Table 2 shows a hierarchical, adaptive throttling strategy for this example.

TABLE 2

| Measured v. Threshold | Action |
| --- | --- |
| M < T − $\delta$ (First Zone) | Allow: R, WS, WL, TS, TL<br>Delay: None<br>Reject: None |
| T − $\delta$ ≤ M ≤ T + $\delta$ (Second Zone) | Allow: WS, WL, TS, TL<br>Delay: R<br>Reject: None |
| M > T + $\delta$ (Third Zone) | Allow: WS, TS<br>Delay: WL, TL<br>Reject: R |

An electronic version of table 2 can be stored in the BT system 70 for use in determining a set of throttling actions to apply to incoming requests.

With reference again to FIG. 10, suppose the control subsystem 74 finds that the measured bandwidth utilized by the virtual service (as indicated by the measure bandwidth parameter 108 in BT object 100) exceeds the first threshold but not the second. The control subsystem 74 looks up in table 2 what throttling action (if any) is to be applied to a read operation for a virtual service whose bandwidth exceeds the first threshold. In this case, the control subsystem 74 obtains from the table a throttling action in the form of a delay request. The control subsystem 74 informs the ATQ that the read operation is to be delayed temporarily until bandwidth usage for the requested virtual service decreases.

It is noted that the above table of throttling actions is universal and can be used by the control subsystem 74 for determining the fate of requests destined for any of the virtual services. However, the bandwidth thresholds and measured bandwidth parameters utilized by the control subsystem 74 during the table look-up are specific to the virtual services themselves and locally maintained in the BT objects associated with the virtual services.

After the I/O for the read operation completes, the ATQ callback is called. This callback is passed the completion status, which includes the number of bytes transferred in the operation and the error codes, if any errors occurred. This information is recorded in the BT object and the state of the BT object is updated.

Figure 12:
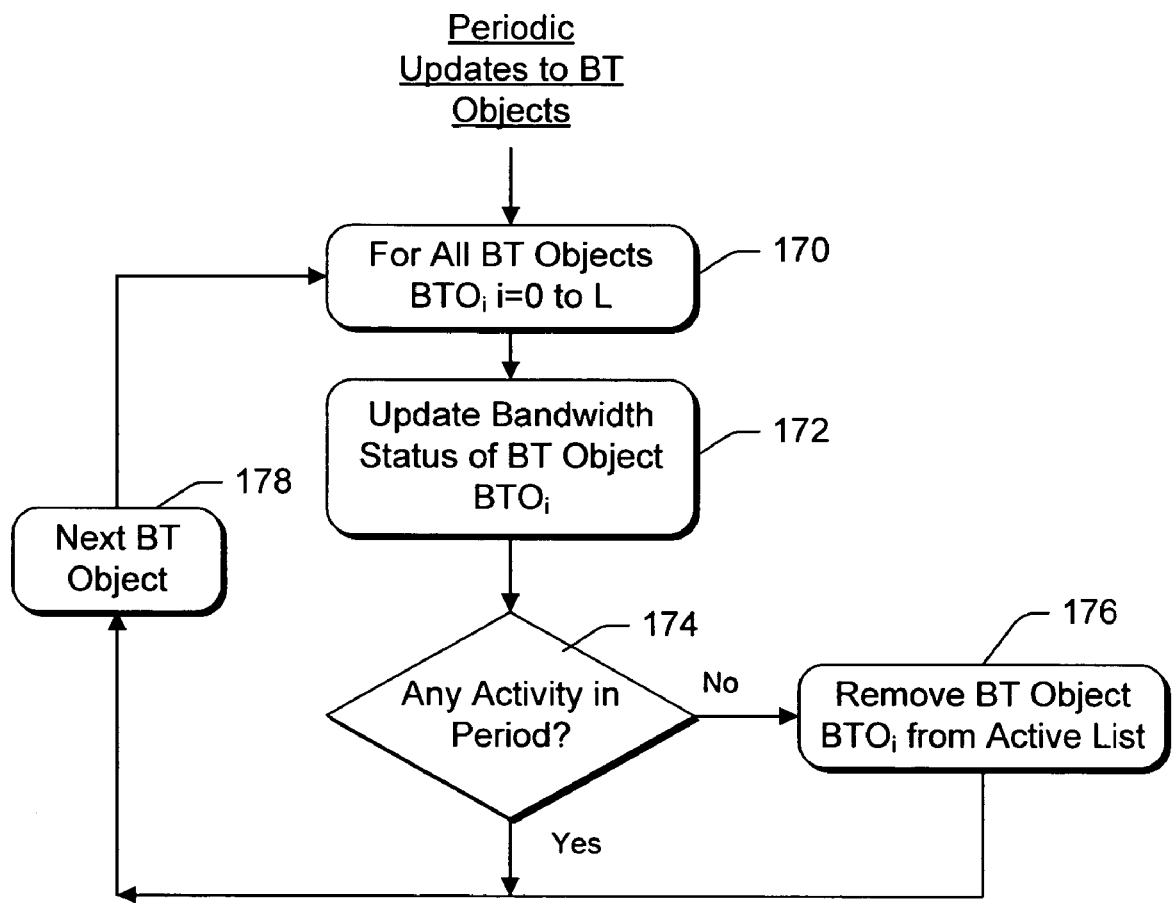
FIG. 12 is a flow diagram showing steps in a method for updating bandwidth measurements in individual BT objects.

FIG. 12 shows steps that are routinely performed to update the measured bandwidth parameter in all active BT objects. For each BT object on the active list 78 (step 170 in FIG. 12), the measuring subsystem 72 updates the measured bandwidth 108 (step 172). By considering only the BT objects on the active list, the BT system 70 reduces the amount of administrative computation time used to update the bandwidth values.

Figure 13:
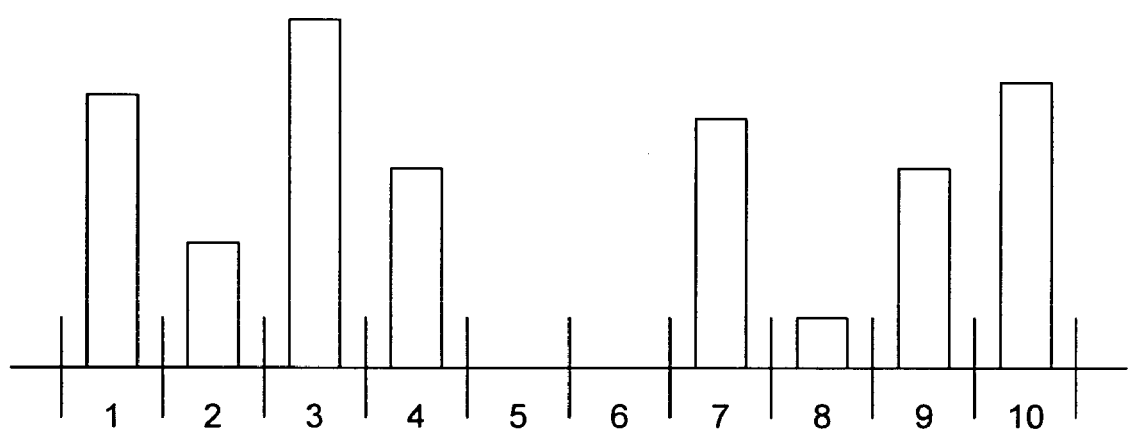
FIG. 13 is a diagrammatic illustration of a histogram stored in a BT object to keep statistics on I/O activity for the virtual service.

One specific technique for computing the bandwidth being consumed by the virtual service is to utilize a histogram. FIG. 13 shows a histogram having ten intervals 1–10 of fixed duration (e.g., one second each). Within each interval, the BT object tracks the I/O activity for the virtual service in terms of the total number of bytes. Byte information pertaining to each operation occurring within an interval is passed to the BT object during the ATQ callback.

Depending on the I/O activity, different byte counts are likely to occur in the various intervals, as represented in FIG. 13.

The byte counts are kept for each interval in the histogram data field 110 of BT object (FIG. 8). The data field has ten cells to maintain the counts of the ten intervals. This data filed is implemented using a circular memory that permits a continuous cycle of the ten memory cells. A current counter 112 indicates which memory cell is presently being filled with byte count data. The BT object 100 also tracks the time consumed for the I/O activity to transfer the bytes to or from the virtual service. The time parameter is kept in data field 114 of the BT object 100 (FIG. 8).

To compute a measured bandwidth, the measuring subsystem 72 totals the byte counts contained in the histogram data field 110 and divides that result by the total time kept in field 114. This calculation yields an average bandwidth usage over the ten-interval time fame. The average bandwidth is then placed in the data field 108 for future use in determining throttling actions for the specific virtual service associated with the BT object.

With continuing reference to FIG. 12, the update process may discover that the virtual service has not recently received any I/O requests. At step 174, the measuring subsystem 72 determines whether any activity has occurred during a past period of preset duration (e.g., the time necessary to cycle through the histogram or longer). If there is activity (i.e., the "yes" branch from step 174), the BT object remains active and flow continues to the next BT object on the active list (step 178). On the other hand, if no activity has occurred (i.e., the "no" branch from step 174), the control subsystem 74 removes that BT object from the active list 78 (step 176 in FIG. 12). The BT object remains on the born list 76, but is no longer carried on the active list 78. Flow then continues to the next BT object on the active list (step 178).

Figure 14:
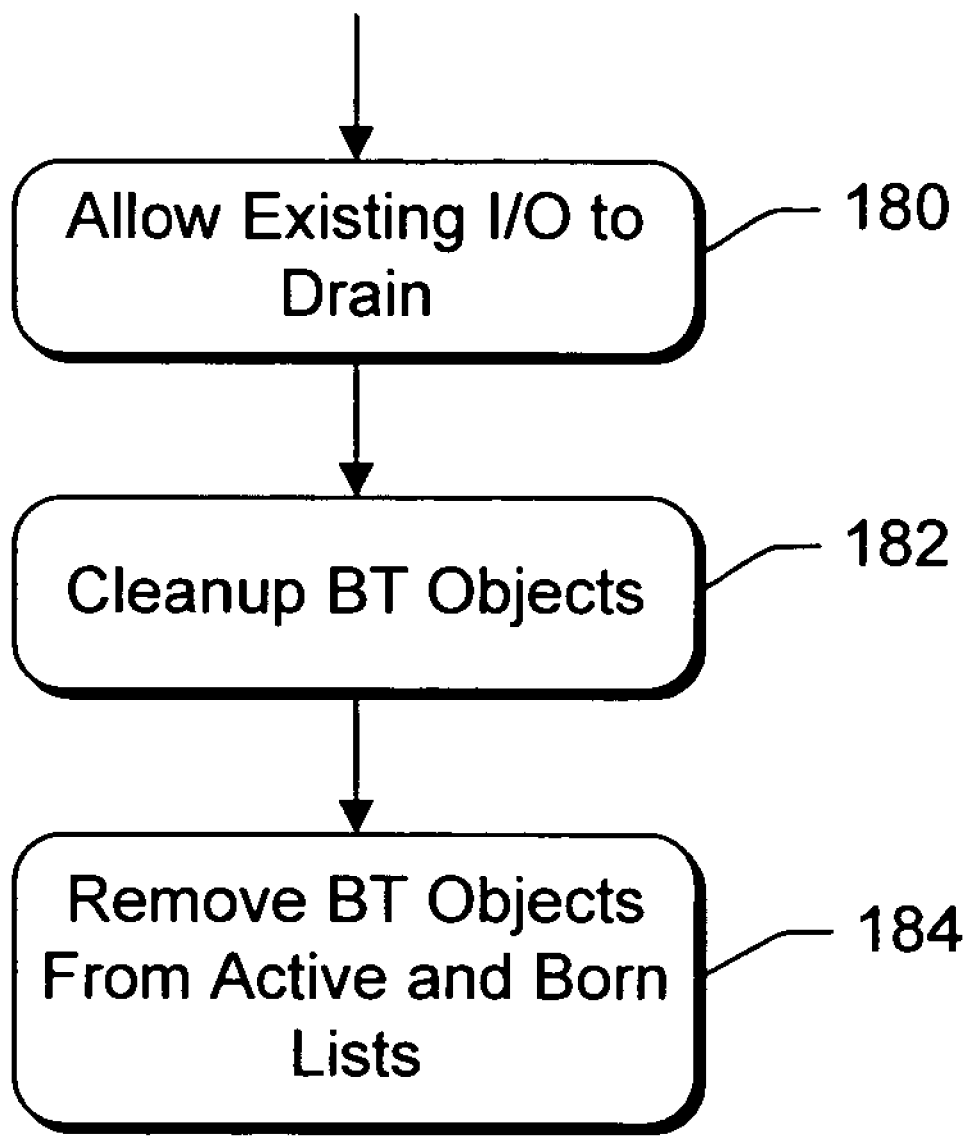
FIG. 14 is a flow diagram showing steps in a method for halting operation of the bandwidth throttling system.

FIG. 14 shows steps in a process for ending the BT system 70. At step 180, all existing I/O operations are permitted to complete. The measuring subsystem 72 and control subsystem 74 cleanup the BT objects (step 182) and remove the BT objects from the active and born lists 76 and 78 (step 184).

The BT system described above is advantageous over prior art bandwidth management techniques because it allows bandwidth control on a per virtual server basis. As a result, the administrator is afforded maximum flexibility at setting fine-tuned throttling policies that impact the virtual services independently of one another.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having stored thereon a plurality of instructions that, when executed by one or more processors of a computer, cause the one or more processors to:

generate a bandwidth value indicating an average bandwidth used by a server to perform previous server operations;

receive a request for the server to perform an additional server operation;

compare the bandwidth value to a threshold; and restrict the request in a first manner if the bandwidth value exceeds the threshold, wherein to restrict the request in the first manner is to prevent the request from being presented to the server.

2. One or more computer-readable media as recited in claim 1, wherein the previous server operations and the additional server operation include one or more of read operations, write operations, and transmit operations.

3. A host system comprising:

at least one network server;

an asynchronous thread queue to receive a request from a client process, to be performed by one of the at least one network server; and a bandwidth throffling system, coupled to the asynchronous thread queue, to determine whether performance of the request by the network server is to be restricted based at least in part on an average bandwidth used by the network sewer in performing previous operations.

4. A host system as recited in claim 3, further comprising an ancillary function driver, coupled to the asynchronous thread queue, to couple the host system to a network.

5. A method comprising:

generating a value indicating a bandwidth used by a sewer to perform previous server operations;

receiving a request for the server to perform an additional server operation; and restricting the request in a first manner if the value exceeds a first threshold but does not exceed a second threshold, and restricting the request in a second manner if the value exceeds the second threshold, wherein the restricting comprises restricting the request in the first manner or the second manner only if the request is of first type.

6. A method as recited in claim 5, wherein the first manner comprises delaying the request.

7. A method as recited in claim 5, wherein the second manner comprises blocking the request.

8. A method as recited in etaim 5, wherein the restricting the request in the first manner comprises preventing the request from being presented to the server.

9. A method as recited in claim 9, wherein the restricting the request in the first manner comprises preventing the request from entering a request queue of the server.

10. A method as recited in claim 5, wherein the value indicates an average bandwidth used by the server.

11. A method as recited in claim 5, wherein the first type comprises a read operation.

12. A method as recited in claim 5, wherein the first type comprises a write operation.

13. A method as recited in claim 5, wherein the first type comprises a transmit operation.

* * * * *

UNITED STATES PATENT AND TRADEMARK OFFICE
CERTIFICATE OF CORRECTION

| | | |
|---|---|---|
| PATENT NO. | : 7,079,546 B2 | Page 1 of 1 |
| APPLICATION NO. | : 11/153057 | |
| DATED | : July 18, 2006 | |
| INVENTOR(S) | : Krishnan | |

It is certified that error appears in the above-identified patent and that said Letters Patent is hereby corrected as shown below:

On the title page, in "Assistant Examiner", in column 2, line 1, delete "Ricarcdo" and insert -- Ricardo --, therefor.

On page 2, item (56), under "U.S. Patent Documents", in column 2, line 3, below "6,437,793 B1* 10/2002 Dillon et al. ................ 709/223" insert -- 6,789,203 B1 09/2004 Belissent --, therefor.

In column 2, line 24, delete "loss in" and insert -- loss. In --, therefor.

In column 10, line 11, before "Variations" delete "It".

In column 11, line 47, after "across" delete "us".

In column 12, line 60, before "asynchronous" delete "a" and insert -- an --, therefor.

In column 18, line 20, in Claim 3, delete "throffling" and insert -- throttling --, therefor.

In column 18, line 24, in Claim 3, delete "sewer" and insert -- server --, therefor.

In column 18, line 30, in Claim 5, delete "sewer" and insert -- server --, therefor.

In column 18, line 39, in Claim 5, after "of" insert -- a --.

In column 18, line 45, in Claim 8, delete "etaim" and insert -- claim --, therefor.

In column 18, line 48, in Claim 9, delete "claim 9," and insert -- claim 5, --, therefor.

Signed and Sealed this

Thirtieth Day of March, 2010

David J. Kappos
*Director of the United States Patent and Trademark Office*